(12) United States Patent
Lauwaert et al.

(10) Patent No.: US 8,963,473 B2
(45) Date of Patent: Feb. 24, 2015

(54) METHOD AND SYSTEM FOR POWERING AND MEASURING POSITIONS OF A PLURALITY OF DC-MOTORS OVER A WIRE INTERFACE

(71) Applicant: Melexis Technologies NV, Tessenderlo (BE)

(72) Inventors: Bart Lauwaert, Hoegaarden (BE); Marc Lambrechts, Leuven (BE)

(73) Assignee: Melexis Technologies NV, Tessenderlo (BE)

( * ) Notice: Subject to any disclaimer, the term of this patent is extended or adjusted under 35 U.S.C. 154(b) by 10 days.

(21) Appl. No.: 13/932,488

(22) Filed: Jul. 1, 2013

(65) Prior Publication Data
US 2014/0002000 A1    Jan. 2, 2014

(30) Foreign Application Priority Data
Jun. 29, 2012  (GB) .................................. 1211541.6

(51) Int. Cl.
*H02P 8/34*       (2006.01)
*H02P 7/29*       (2006.01)
*H02P 5/68*       (2006.01)

(52) U.S. Cl.
CPC .............. *H02P 8/34* (2013.01); *H02P 7/2913* (2013.01); *H02P 5/68* (2013.01)
USPC .............................. 318/599; 318/560; 318/34

(58) Field of Classification Search
CPC ........................................................ H02P 8/34
USPC ........................................... 318/599, 560, 34
See application file for complete search history.

(56) References Cited

U.S. PATENT DOCUMENTS

| | | | |
|---|---|---|---|
| 5,253,138 A | 10/1993 | Droulon et al. | |
| 5,545,961 A | 8/1996 | Peter et al. | |
| 5,705,907 A | 1/1998 | Miyamori et al. | |
| 5,742,143 A * | 4/1998 | Katagiri ........................ | 318/625 |
| 2005/0046367 A1 | 3/2005 | Wevers et al. | |

(Continued)

FOREIGN PATENT DOCUMENTS

| | | |
|---|---|---|
| DE | 3141068 A1 | 5/1983 |
| EP | 0415655 B1 | 5/1996 |
| WO | 9605542 A1 | 2/1996 |
| WO | 2007129063 A2 | 11/2007 |

OTHER PUBLICATIONS

International Search Report from corresponding GB Application No. GB1211541.6, Nov. 12, 2012.

(Continued)

*Primary Examiner* — David S Luo
(74) *Attorney, Agent, or Firm* — Workman Nydegger

(57) ABSTRACT

A system comprising a motor controller for providing a plurality of first power signals and a single common second power signal to a motor module comprising a plurality of potentiometers connectable to a plurality of DC-motors. The power signals and feedback signals are sent over a wire interface having less than three wires per motor. A position feedback signal is read when a motor is being powered. The power signals may be DC-signals, pulsed or tri-state signals. The circuit may have a voltage divider consisting of two or three resistors. The actual motor position can be derived from the position feedback signals using one of two formulas or curves. A motor controller, and a method for driving a plurality of DC-motors is also disclosed.

20 Claims, 9 Drawing Sheets

(56) References Cited

U.S. PATENT DOCUMENTS

2007/0103103 A1    5/2007    Maue et al.
2009/0195208 A1    8/2009    Gunton

OTHER PUBLICATIONS

International Search Report from corresponding GB Application No. GB1211541.6, Jun. 28, 2013.

\* cited by examiner

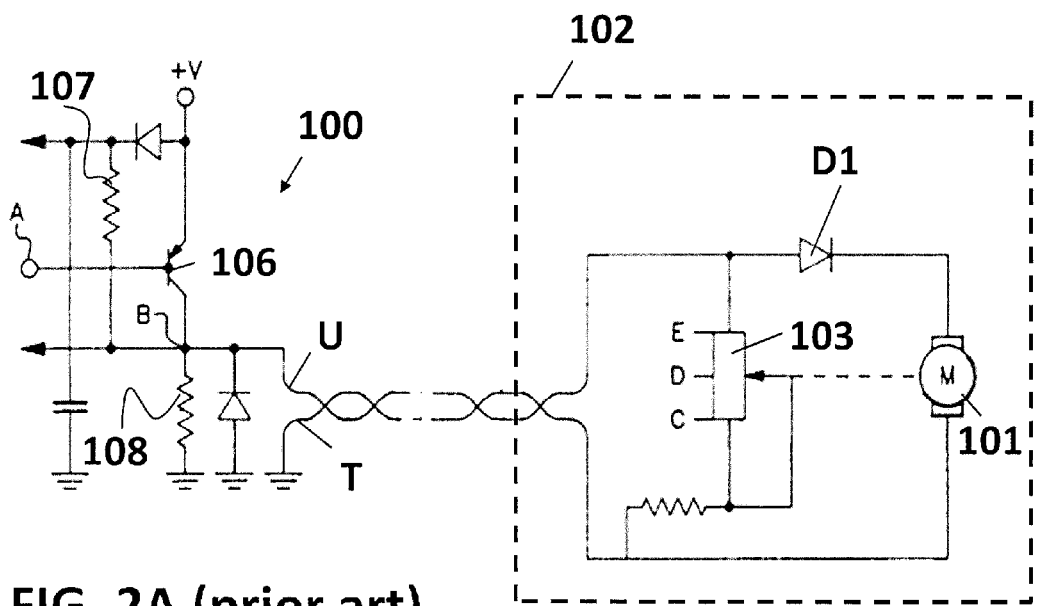
FIG. 2A (prior art)
FIG. 2B (prior art)
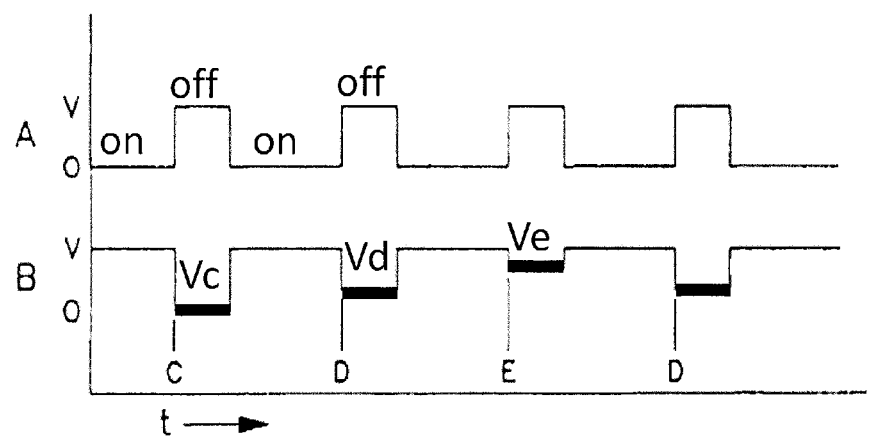
FIG. 2C (prior art)

Error difference for Rpot=9.5KΩ and 10.5 Ω

METHOD AND SYSTEM FOR POWERING AND MEASURING POSITIONS OF A PLURALITY OF DC-MOTORS OVER A WIRE INTERFACE

FIELD OF THE INVENTION

The present invention relates to the field of a motor controller for a DC-motor. More specifically the invention relates to a system and method for powering a plurality of DC-motors and for measuring their positions over a wire interface.

BACKGROUND OF THE INVENTION

A DC motor is an electric motor that can run on direct current (also known as DC-current). Low power (e.g. <1 kW) DC motors are used in many applications (e.g. toys, disk drives, etc), and can operate directly from batteries. When a constant voltage is applied to a DC-motor, it will typically rotate at a constant speed (optionally after a transient behaviour). During this rotation a voltage called "back-emf" is induced in the rotor windings, which compensates the applied voltage.

DC-motors are not always used for continuous rotation, but also for position control, e.g. for opening or closing a valve, or setting the valve opening at a specific value. Circuitry has been developed for driving the DC motor to the desired position, and for keeping the DC-motor in that position, even when an external force is applied. Such circuits are typically called "servo systems". In order to set and maintain a desired position, the servo system needs a signal indicative of the actual motor position. Servo control can then e.g. be performed by using this position signal in a negative feedback-loop, where a difference signal is calculated between the desired position and the actual position, which difference signal may optionally be amplified, and applied to the DC-motor. Such circuits are well known in the art.

U.S. Pat. No. 5,705,907 describes a drive control system for limiting overshoot when the actual position of the DC-motor reaches a target position. A block diagram of such a circuit is replicated in FIG. 1. It has a CPU 104 sending a PWM signal as a command-signal to a driver 105, which delivers power to a motor 101. A disadvantage of such motor control system is that the motor module 102 actually requires five wires, which implies additional handling and material cost. This may be important in applications where the distance between the CPU 104 and/or driver 105 on the one hand, and the motor 101 on the other hand is relatively large (e.g. larger than 50 cm), especially in high-volume, cost sensitive applications, such as e.g. air-conditioning systems for vehicles.

EP0415655 describes a two-wire power and position control system between a central station 100 (i.e. the motor controller) and a remote station 102 (i.e. the motor module). FIGS. 2A, 2B and 2C of this document correspond to FIGS. 5 (left part), FIG. 7 and FIG. 8 of EP0415655(B1), respectively. A disadvantage of this circuit is that the motor can only be driven in a single direction, which makes this circuit unsuited for many practical applications.

SUMMARY OF THE INVENTION

It is an object of embodiments of the present invention to provide a good method and system for powering and controlling a plurality of remote DC-motors.

The above objective is accomplished by a method and device according to the present invention.

In a first aspect, the present invention relates to a motor control system for controlling a plurality of DC-motors. The motor control system comprises:

a motor controller, configured for providing a number of first power signals each for being applied to one of the DC motors and a single common second power signal for powering the plurality of DC-motors, and configured for receiving a plurality of position feedback signals from the plurality of DC-motors;

one or more motor modules connectable to the plurality of DC-motors and comprising for each of the plurality of DC-motors a variable impedance configured for being operatively connected to one of the DC motors and for creating an impedance indicative of a position of said one DC-motor; and a wire interface for interconnecting the one or more motor modules and the motor controller for transferring the plurality of first power signals and the single common second power signal and the plurality of position feedback signals.

Each variable impedance is arranged for being powered by one of the first power signals and by the common second power signal and for generating one of the position feedback signals when the corresponding DC-motor is being powered. The number of wires of the wire interface is twice the number of DC-motors plus one. As examples only, the motor control system may be for controlling two motors, in which case five wires are sufficient, or the motor control system may be for controlling three motors, in which seven wires are sufficient.

It is an advantage of embodiments of the present invention that driving and monitoring the position of a plurality of DC-motors may take place over a wire interface having less than three wires per motor. Hence, compared to prior art solutions, a reduced number of wires may be used.

Advantageously, in embodiments of the present invention each DC motor can be driven in either direction (selectively clockwise and counter clockwise), and the motor position can be read even when the motor is substantially stationary.

The motor may or may not be part of the motor module. The motor module may e.g. comprise or consist of a PCB with a potentiometer. The motor module may have a multi-pins connector for connection with the multi-wire interface. The motor module may have a plurality of two-pins connectors for connection with each of the motor terminals. The module may further have a rectifier circuit. The module may further have a voltage divider circuit.

In embodiments of the present invention, the number of DC motors is two, and the wire-interface has exactly five wires. This embodiment allows two motors to be driven over a five-wire interface instead of over a six-wire interface as known in the art, which leads to a 16% material savings, which is huge advantage, especially for mass-volume products such as automotive products, or consumer electronics products.

In embodiments of the present invention, the number of DC motors is three, and the wire-interface has exactly seven wires. This embodiment allows three motors to be driven over a seven-wire interface instead of over a nine-wire interface, which leads to a 22% material savings, which is a huge advantage, especially for mass-volume products such as automotive products, or consumer electronics products.

In embodiments of the present invention, the motor controller is configured for reading the position feedback signal when the corresponding DC-motor is being powered.

This is a different principle as the one that was used in EP0415655.

In embodiments of the present invention, each variable impedance is a potentiometer. The potentiometer may e.g. be mechanically connectable or connected to the shaft of the motor, and electrically connectable or connected to the terminals of the DC-motor.

In embodiments of the present invention, the potentiometer may be configured for receiving the same power signals as the corresponding DC-motor. In such embodiments, the potentiometer may be arranged in parallel to the DC-motor, whereby the terminals of the potentiometer may be electrically connected to the terminals of the DC-motor, without any intermediate components, such as e.g. resistors, diodes, etc.

In embodiments of the present invention, the motor module may further comprise a rectifier for applying a DC voltage to its potentiometer when the corresponding DC-motor is being powered for turning in a first direction (e.g. clock-wise) or in a second direction (e.g. counter-clock-wise). In this way, a polarity change over the potentiometer may be avoided, which simplifies the position determination of the DC-motor.

In embodiments of the present invention, the motor controller may be configured for providing a pulsed power signal as at least one of the first and second power signal. An advantage of pulsed power signals is that they can easily be generated in an integrated circuit having general purpose input-output pins, or by using a pulse-width-modulator (PWM). In addition, the generation of such signals does not require a heavy CPU-load; and Digital-To-Analog convertors (DAC) and/or external filters (e.g. RC-filters) can also be avoided. Furthermore, by applying a large voltage over the DC-motor, a large torque can be applied, so that the risk that the motor stalls is reduced. Finally, the motor torque can easily be determined by modifying the pulse duration (in case of discrete pulses), or the duty cycle (in case of a PWM-signal) of the power signals.

In embodiments of the present invention, the motor controller comprises:
at least one analog-to-digital-convertor for digitizing the position feedback signals;
at least one pulse width modulation module for generating at least one pulse width modulated signal as at least one of the first and second power signals;
a processing unit provided with an algorithm for determining a duty cycle of the at least one pulse width modulation module for driving the plurality of DC-motors at a plurality of pre-defined positions.

With present state of technology, such a motor controller can be implemented in a mixed digital, mixed analogue single chip, sometimes also referred to as mixed-mode CMOS technology.

In embodiments of the present invention, the motor control system may further comprise at least one voltage divider, arranged for reducing the amplitude of the position feedback signals (Ps) to a range suitable for the at least one analog-to-digital-convertor. The voltage divider may be located on either side of the wire-interface, near the motor module or near the motor controller. Preferably there is a voltage divider for each of the position feedback signals.

In embodiments of the present invention, the or each voltage divider may consist of only two resistors. In other embodiments, the voltage divider may consist of only three resistors. An advantage of a voltage divider consisting of only two or three resistors is that it does not require active components, such as a buffer or amplifier. By selecting appropriate values for the resistors of the voltage divider and the resistance of the potentiometer, the non-linearity of the voltage divided feedback signal versus the actual motor position can be reduced, and thus the measurement error can be reduced.

In embodiments of the present invention, the motor controller may be provided with an algorithm for correcting a non-linear relation between the actual motor positions and the position feedback signals.

Where accurate motor positioning is not required, the relation can be approximated by a linear curve, or a piece-wise linear curve having e.g. two or three linear portions. However, in applications where accurate motor position is important, an accurate correction is needed, e.g. by using a look-up-table stored in memory, or by calculations using mathematical formulae.

In a second aspect, the present invention also relates to a motor module, as may be used in any of the motor control systems in accordance with the first aspect. The motor module is connectable to a plurality of DC-motors. The motor module comprises a plurality of variable impedances, each configured for being operatively connected to one of the plurality of DC motors and for creating an impedance indicative of a position of said one DC-motor. The motor module is connectable via a wire interface to a motor controller, the number of wires of the wire interface being twice the number of DC-motors to be connected to the motor module, plus one. The motor module is configured for receiving a plurality of first power signals, each for being applied to one of the DC-motors, and a single common second power signal for powering the plurality of DC-motors and for powering the plurality of variable impedances, and for generating a position feedback signal at a moment when the first and second power signals have different voltage levels.

Such a motor module may be especially configured for cooperating with a corresponding motor controller over the wire interface. The motor module may also comprise the DC-motor, in which case the potentiometer may be operatively connected to the DC-motor shaft, and may be electrically connected to the motor terminals.

The motor module may for instance have a first connector with 2×N+1 pins for connection to the wire interface, N being the number of motors, and N second connectors having three pins for connecting one of the first power signals and the common second power signal to one of the motors, and for receiving the position signal from said motor.

The motor module may comprise a single PCB (printed circuit board), or multiple PCB's, interconnected to each other, but need not necessarily comprise a PCB.

In a third aspect, the invention also relates to a motor controller for controlling a plurality of DC-motors, as may be used in such motor control system, the motor controller being connectable via a wire interface to one or more motor modules connectable to the plurality of DC-motors and comprising for each of the plurality of DC-motors a variable impedance configured for being operatively connected to one of the DC motors and for creating an impedance indicative of a position of said one DC-motor. The motor controller is configured for providing a plurality of first power signals, each for being applied to one of the DC motors, and for providing a single common power signal for powering the plurality of DC-motors. The motor controller is furthermore configured for powering the plurality of variable impedances which are configured for generating a position feedback signal when being powered. The motor controller is configured for reading at least one of the position feedback signals at a moment when the corresponding first power signal and the common second power signal have different voltage levels.

Such a motor controller may be especially configured for cooperating with a corresponding motor module over the wire interface, for instance for cooperating with a motor module according to embodiments of the second aspect of the present invention.

A motor controller in accordance with embodiments of the present invention is ideally suited for being implemented in an at least partly digital IC with a programmable CPU. By digitizing the position feedback-signal, any non-linearity of the system can be easily corrected in the digital domain. In addition, it allows the hardware to be simplified.

In a fourth aspect, the present invention also relates to a method for driving a plurality of DC-motors over a wire interface selectively in a first and second direction, whereby the number of wires of the wire-interface is twice the number of DC-motors plus one, and for reading the positions of the plurality of DC-motors. The method comprises the steps of: a) generating a plurality of first power signals and generating a single common second power signal, and applying the plurality of first power signals and the single common second power signal to the plurality of DC-motors over the wire interface, whereby at least one of the first power signals and the single common second power signal have different voltage levels for driving at least one of the DC-motors; b) generating at last one position feedback signal of said at least one driven DC-motor, and applying the at least one position feedback signal to the wire interface; c) determining at least one actual position of the at least one driven DC-motor based on the at least one position feedback signal; d) adjusting the plurality of first power signals and the single common second power signal based on the at least one actual motor position and on a plurality of predetermined motor positions, and applying the adjusted power signals to the wire interface.

Such a method is especially configured for powering a number of DC-motors and for reading their position over a wire interface having less than three wires per motor, as in accordance with embodiments of the present invention.

It is an advantage that, by applying appropriate signals to the wire interface, each motor may be driven individually to different predetermined positions. The motors may be driven in a time division multiplexed manner, that is, in time slots. In embodiments of the present invention, only one motor is driven per time-slot, while the other motors are not powered in that particular time-slot. However, it also possible to drive more than one motor per time-slot. The motors may be driven in the same or opposite directions (e.g. clockwise/counter-clockwise), or may be kept in a stationary position, or any combination hereof.

In embodiments of the present invention, it may for example be possible to apply a "short positive pulse" or a "short negative pulse" simultaneously to all motors, for simultaneously reading out all of the motor positions, which is faster than reading each motor position one after the other. If the motors are in a stationary position, then preferably an opposite short pulse is applied to compensate for the first pulse.

In embodiments of the present invention, the determination of the actual position of the at least one driven DC-motor in step c) includes determining whether the corresponding momentary first power signal is larger or smaller than the common second power signal.

For example, in case the motor is powered for turning in a first direction, e.g. "clock-wise", a first calculation may be used, and when the motor is powered for turning in a second direction, e.g. "counter-clock-wise", a second calculation different from the first calculation may be used. The calculations may be based e.g. on a first/second formula, or may be based e.g. on a first/second look-up table. This offers the advantage that a rectifier circuit can be avoided.

Generating at least one position feedback signal may include generating a position feedback signal over a variable resistance, for instance a potentiometer. In such an embodiment, the method may further comprise rectifying the first and second power signal for powering the variable resistance, e.g. potentiometer. This offers the advantage that the calculation of the actual motor position from the position feedback signal can be simplified.

In embodiments of the present invention, generating the first and second power signals may comprise providing two different signals selected from the group of a supply voltage, a ground voltage and a pulse width modulated signal during a time interval, e.g. a predetermined time interval. By using such signals, either a voltage difference equal to the supply voltage can be applied to the DC-motor to apply maximum positive or maximum negative torque, or no voltage difference to apply no torque, or a voltage with an intermediate average value to apply an intermediate average torque, during the time interval.

In embodiments of the present invention, generating a first and second power signal may comprise providing a pulse width modulated signal as one of the first and second power signals, and providing a DC signal as the other one of the first and second power signals.

Each motor for which the first power signal and the second common power signal has a different voltage level, is actively driven. One or more motors may be simultaneously driven at any instant in time.

Preferably the pulse width modulation signal and the DC signal have the same voltage level as the supply voltage. By using such signals, a voltage difference equal to the supply voltage can be applied to the DC-motor(s), allowing to provide maximum torque. This may be implemented by simply switching voltages or by using a PWM-module. Use of a PWM-module allows to create (on average) intermediate values of the torque, even for a constant time-slot.

In an example where only one motor is actively driven per time-slot, the values of the first and second power signals may be chosen so as to drive this one motor in the desired direction, e.g. clockwise, and the values of the first power signals of all the other motors may be chosen so as to provide no torque to these other motors, e.g. by applying to these motors a first power signal equal to the second power signal, or by providing as the first power signal a tri-state signal (also known as high-impedance state).

In such an embodiment, the DC-signal may be substantially equal to half of the supply voltage.

The DC-signal may be a fixed voltage between ground and the supply voltage, e.g. having a voltage level substantially equal to half of the supply voltage. In this way a "pin" can be saved when using an IC, and software complexity can be reduced as this voltage can be made outside of the IC, while still allowing all of the DC-motors to be driven in either "clockwise" or "counter-clockwise" direction. In addition, the motors can be driven by only changing the duty-cycle of the first power signals. This embodiment has the additional advantage that all motors can be driven in each time-slot, in either direction, e.g. clockwise or counter-clockwise, substantially 100% of the time. A 50% duty cycle would typically correspond to actively maintaining the DC-motor position in a stable position, a duty cycle smaller resp. larger than 50% would cause the motor to turn in the first resp. second direction.

In embodiments of the present invention, the at least one of the first power signals may be set to tri-state. This offers the advantage that the first power signals of the motors not being actively driven need not be adapted along with the level of the second common power signal changes, as would be the case otherwise, but can remain tri-state as long as these particular motors are not being driven, nor their positions are being measured. Using tri-state signals may simplify the software, provide less switching noise, cause less current spikes in the motor and over the wire-interface, and may thus create less EMI (electro-magnetic interference).

In embodiments of the present invention, the method may furthermore comprise digitizing the position feedback signal in an analog-to-digital-convertor.

In embodiments of the present invention, the method may furthermore comprise a step e) of reducing the amplitude of the position feedback signal. In embodiments of the present invention, reducing the amplitude of the position feedback signal may include using a voltage divider comprising passive components, e.g. comprising only passive components. By avoiding active components such as buffers, power can be saved, and the circuit can be simplified. In addition, by choosing appropriate values for the components, the actual motor position can be determined with great precision, e.g. less than 1% position error.

In embodiments of the present invention, the method may further comprise a step f) of executing an algorithm for correcting a non-linear relation between the actual DC-motor position and the position feedback signal. Such algorithm may e.g. be implemented by using a look-up table and linear interpolation, or by using mathematical formulas. The skilled person can make a trade-off between position error, and the number of values and the number of bits per value in such a table.

Particular and preferred aspects of the invention are set out in the accompanying independent and dependent claims. Features from the dependent claims may be combined with features of the independent claims and with features of other dependent claims as appropriate and not merely as explicitly set out in the claims.

The above and other aspects of the invention will be apparent from and elucidated with reference to the embodiment(s) described hereinafter.

BRIEF DESCRIPTION OF THE DRAWINGS

FIG. 2A and FIG. 2B show a circuit schematic of another motor control system known in the art, whereby the remote motor module is connected via two wires. FIG. 2A shows the motor controller, FIG. 2B the remote motor module.

FIG. 2C shows an example of power and position feedback signals for the circuit of FIGS. 2A and 2B.

Figure 1:
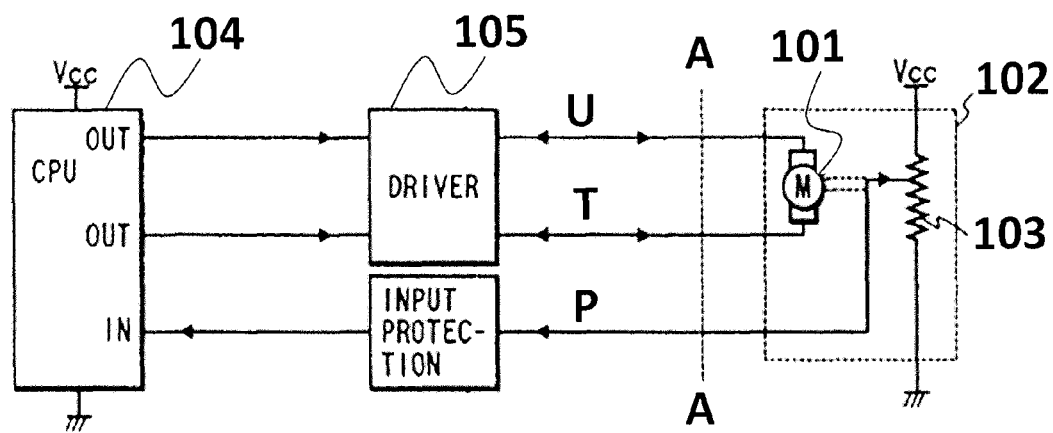
FIG. 1 shows a block-diagram of a motor control system known in the art, whereby the motor module requires five wires.

The drawings are only schematic and are non-limiting. In the drawings, the size of some of the elements may be exaggerated and not drawn on scale for illustrative purposes.

Any reference signs in the claims shall not be construed as limiting the scope. In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Where in embodiments of the present invention reference is made to "turning clockwise" resp. "turning counter clockwise", a first resp. a second direction of rotation of a motor is meant, the second direction being opposite to the first direction, or vice versa.

FIG. 1 shows a prior art circuit of a motor control system having a motor module 102 requiring five wires: two wires U, T for powering a motor 101, one wire P for providing a position feedback signal, and two additional wires for powering a potentiometer 103 with a power supply VCC and ground GND. Applying a constant voltage (e.g. VCC−GND=12 V) to the potentiometer 103 has the advantage that the feedback signal Ps (on the wire P) is not directly dependent on the voltage levels of the first and second power signals Us, Ts applied over the power wires U, T to the DC-motor 101, only indirectly when the motor 101 changes position. It is to be noted that the feedback signal Ps, indicative of the rotational position of the motor 101, is present even when no power is supplied to the motor 101 over the power wires U, T. Since the feedback signal Ps is always present (time continuous) and changes gradually as the motor 101 rotates clockwise or counter clockwise, such a feedback signal Ps is ideal for use in a time-continuous analog control circuit. The circuit of FIG. 1 is relevant for the present application mainly as an example of a motor-system with a DC-motor capable of rotating selectively both clockwise and counter clockwise, whereby the position of the motor 101 can be determined also in a stationary position of the motor (i.e. when not rotating), and requiring five wires for powering and position feedback.

FIG. 2A shows another prior art power and position control system 100, also called "control station" connected to a remote motor module 102, also called "remote station", shown in FIG. 2B over a two-wire interface U, T, for generating a physical displacement by a permanent magnet DC-motor 101. A pulsating voltage is applied to the link U, T as the power source for the DC motor 101. The physical displacement information of the motor 101 is extracted by the control station 100 within the off-cycles of the pulsating power signal Us on the wire U (i.e. when A is high, so that transistor 106 is off and no power pulse is sent to the motor 101). The remote station 102 is arranged to sequentially connect a variable impedance 103 to form part of a voltage divider, the change in impedance being used to affect a voltage derived from the voltage divider at the control station 100. Since one of the wires T is permanently connected to ground, and the other wire U can be driven only by a value equal to either of GND or the positive power supply +V, depending on the value of the input signal A, the motor 101 can only be driven in a single direction, e.g. "clockwise". Moreover, the diode D1 only allows current to flow in one direction through the motor 101. Thus this circuit is not suitable for driving the motor 101 in both directions (selectively clockwise and counter clockwise). As described in more detail in EP0415655(B1) in relation to FIG. 7 and FIG. 8 thereof, the principle of providing position feedback is based on voltage division measured "between the power pulses". Referring back to FIG. 2A and FIG. 2C of the present document, when the input A is low, the pnp-transistor 106 is "on", and the voltage +V is applied to node B and thus to the line U for powering the motor 101, which will start rotating in a first direction, e.g. "clockwise" as long as the input A is low. When the input A is set high, the pnp-transistor 106 is switched "off", and a voltage division will occur (over the resistors 107, and 108 in parallel with the resistors of the motor module 102). This will cause a voltage Vc, Vd or Ve to be placed on the two-wire interface U,T, which is indicative of the position of the motor 101. The position information is thus available during the "off"-periods, i.e. at a moment when no power is delivered to the motor 101 by the drive circuit 100. The line portions corresponding to the position feedback signals are indicated in FIG. 2C in thicker line width for illustrative purposes.

Figure 3A:
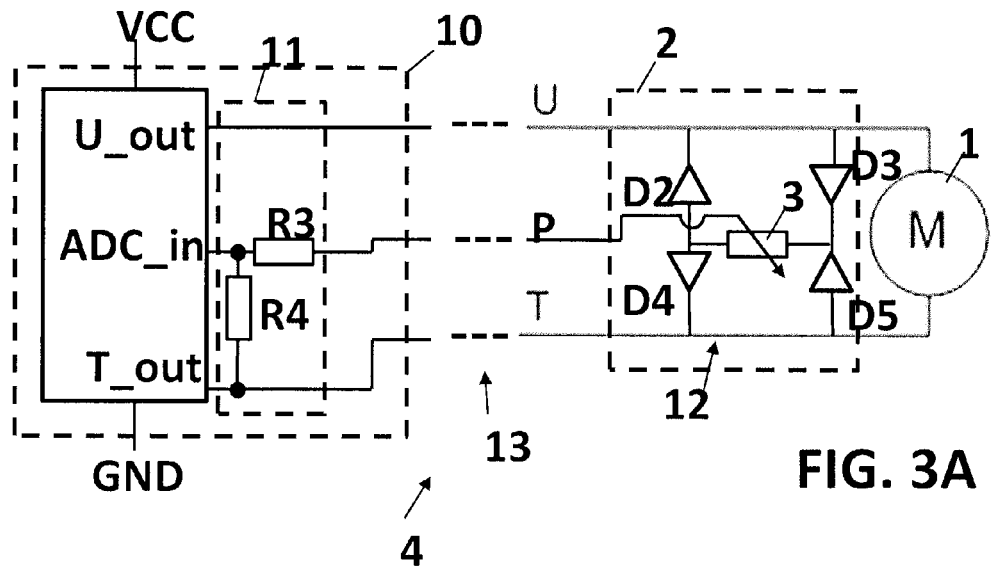
FIG. 3A shows an electrical system as can be part of embodiments of the present invention, comprising a motor controller (left), a three wire interface (middle) and a motor module (right). The motor module comprises a rectifier and a potentiometer, and requires only three wires for powering and measuring the motor position.

FIG. 3A shows a motor power and position measurement system as can be used in embodiments of the present invention. The motor power and position measurement system comprises a motor control circuit 10 (left), also referred to as motor controller 10, and a motor module 2 (right). The motor module 2 is connected to the motor controller 10 via a three-wire interface 13, comprising three wires U, T, P for transporting resp. a first and second power signal Us, Ts from the motor controller 10 to the motor module 2, and a position feedback signal Ps from the motor module 2 to the motor controller 10. The motor module 2 shown in FIG. 3A comprises a DC-motor 1, and a potentiometer 3 operatively, e.g. mechanically, coupled to the motor 1 for converting a position, e.g. rotational position of the motor 1 into a variable resistance. The motor module 2 further comprises a rectifier circuit 12, comprising four diodes D2-D5. The motor controller 10 may optionally further comprise a voltage divider 11, for redlining the voltage level of the position feedback signal Ps, e.g. to the input range of an analog-to-digital (ADC)-convertor which may be present in the motor controller 10. The motor 1 can be selectively driven in either direction, i.e. clockwise or counter clockwise, by applying suitable first and second power signals Us, Ts to the power lines U, T of the three-wire interface 13. The position of the motor 1 can be determined by means of the signal Ps placed on the third wire P by the potentiometer 3. It is to be noted that the motor 1 may also be external to the motor module 2, in which case the potentiometer 3 is operatively connectable, and electrically connectable to the motor 1. In a simple implementation, the voltage divider 11, which is optional, comprises, e.g. consists of two resistors R3, R4 connected in series, the series connection at one end being connected to ground GND, and at the other end being connected to a third node (also called output node) of the potentiometer 3. But other voltage reducing circuits are also possible, e.g. a circuit comprising a buffer. However, the simplest (and cheapest) hardware solution is a voltage divider consisting of only two resistors, without a buffer.

Figure 3B:
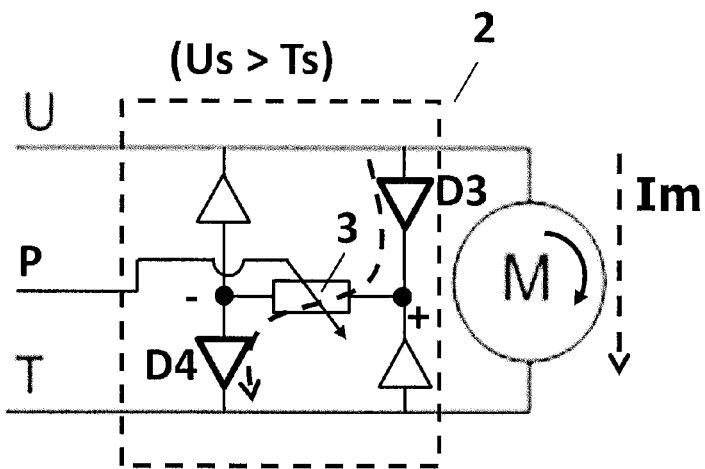
FIG. 3B illustrates the current flow in the motor module of FIG. 3A, in case the motor is powered for turning in a first direction, e.g. clockwise.

FIG. 3B illustrates what happens when a first power signal Us having a momentary voltage level larger than that of the second power signal Ts is applied to the first resp. second power line U, T of the motor module 2. Suppose e.g. that during a time period ΔT, Us is set to a high voltage, e.g. 12V DC, and Ts is set to a low voltage, e.g. 0V DC, then a current Im will flow through the motor 1 as indicated by the arrow, for powering the motor 1 for turning in a first direction, e.g. clockwise. At the same time, i.e. while the motor 1 is being powered, a current will also flow through diode D3, potentiometer 3 and diode D4, thereby creating a voltage drop over the potentiometer 3, so as to create a position signal Ps which is applied to the third wire P of the interface 13. The value of Ps is an indication of the position of the motor 1 when powered for turning clockwise.

Figure 3C:
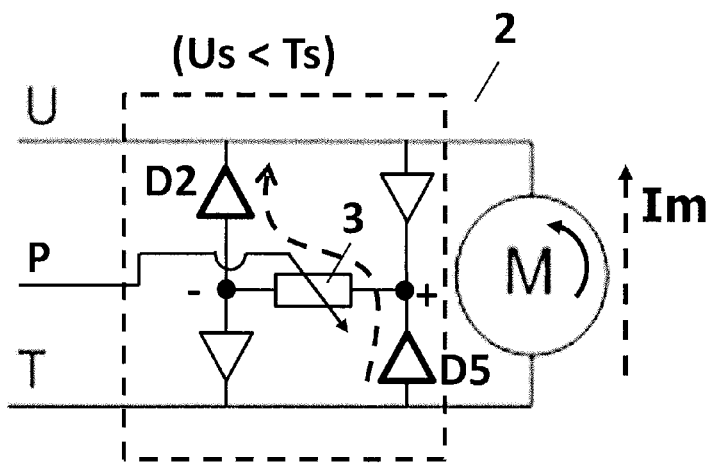
FIG. 3C shows the current flow in the motor module of FIG. 3A, in case the motor is powered for turning in a second direction, e.g. counter clockwise.

FIG. 3C is a variant of FIG. 3B, and illustrates what happens when a voltage Us having a momentary value smaller than Ts is applied to the first resp. second power line U, T of the motor module 2. Suppose e.g. that during a time period ΔT, Us is set to a low voltage, e.g. 0 V DC, and Ts is set to a high voltage, e.g. 12 V DC, then a current Im will flow through the motor 1 as indicated by the arrow, for powering the motor 1 for turning in a second direction opposite the first direction, e.g. counter clockwise. At the same time, i.e. while the motor 1 is being powered, a current will also flow through diode D5, potentiometer 3 and diode D2, thereby creating a voltage drop over the potentiometer 3, so as to create a position signal Ps which is applied to the third wire P of the interface 13. The value of Ps is an indication of the position of the motor 1 when the motor 1 is powered for turning counter clockwise.

When the motor 1 is powered, the position feedback signal Ps will assume values in a predetermined range, e.g. in the range of about 0.6 V to about 11.4 V (assuming a 12 V supply voltage, and assuming a 0.6 V voltage drop over the diodes). In case the motor controller 10 is at least partly digital, and comprises an analog-to-digital convertor ADC1 in the motor controller 10, the voltage range of the feedback signal Ps needs to be reduced to the input range of the ADC, which is e.g. only 0.0 V to 1.0 V. A function of the optional voltage divider 11, if present in the motor control system 10 of FIG. 3A, is therefore to decrease the amplitude of the position feedback signal Ps to a smaller value. As an example, if e.g. R4=1 kΩ, and R3=13 kΩ, then R4/(R3+R4)=1/14, so that the original feedback signal range in the example of about 0.6 V to about 11.4 V would, as an approximation, be reduced to a range of about 0.04 V to about 0.81 V. More exact results can be obtained by e.g. circuit simulations.

When comparing FIG. 3B and FIG. 3C it can be seen that the node of the potentiometer 3 located at the right in FIG. 3B and FIG. 3C is always the positive node, independent of whether the first power signal Us is larger or smaller than the second power signal Ts, hence the notation "+", and that the node located on the left in these figures is always the negative node, hence indicated by "−".

For completeness it should be mentioned that no current flows through the potentiometer 3 in case the instantaneous voltage level of Us equals that of Ts, at which moment also no power is provided to the motor 1. Thus no position feedback is provided at a moment in time when the motor 1 is not being powered, i.e. when no voltage difference is applied over the motor terminals.

It is an advantage of the circuit illustrated in FIG. 3A that the motor module 2 only requires three instead of five wires, thus saving material and handing costs, and that it enables the motor 1 to be driven selectively in either direction (clockwise or counter clockwise), which makes it suitable for many applications, and that the motor position can be read, even when the motor 1 is in a stationary position. This last aspect is further explained below.

If the motor position is to be determined without intentionally forcing the motor 1 to rotate, a "short" pulse (e.g. less than 5 ms, or less than 1 ms, e.g. less than 500 μs) can be applied to the power wires U, T. For example Us=12 V and Is=0 V (further referred to as a "clockwise power pulse") during a time period of e.g. 20 μs (microseconds). Thanks to the inertia of the motor 1, it will only marginally rotate to the right. The time period should be sufficiently large for reading the position information, and sufficiently short for not moving the motor 1 "too far" (e.g. beyond a predefined angular position). If desired, another pulse can then be applied to the motor 1 for moving the motor marginally back counter clockwise, so as to compensate the first pulse, e.g. by applying Us=0 V and Ts=12 V (further referred to as a "counter clockwise power pulse") during the same period. It will be clear for a person skilled in the art that the first pulse may be a "counter clockwise pulse", and that then optionally a second, "clockwise pulse" may be given to compensate for this first pulse.

If the motor 1 needs to be moved to a desired target position, e.g. a predefined target position, which position subsequently needs to be maintained, the motor controller 10 may repeatedly, e.g. periodically apply clockwise or counter clockwise power pulses, having a fixed or a variable pulse duration, to the power wires U, T for moving the motor 1 to the desired position. Once that position is reached, "clockwise" and "counter clockwise power pulses" may alternately be applied for moving the motor 1 marginally clockwise, and marginally back counter clockwise, thereby in effect maintaining the motor position with a given torque. During these power pulses the motor position can be measured, and the duration of the "clockwise" and "counter clockwise power pulses" may be adjusted for maintaining the motor position. Alternatively, when the motor 1 has reached the target position, the motor controller 10 may put the same signal, e.g. Us=Ts=0 V or Us=Ts=12 V, to both power wires U and T during a predetermined time period. Such a combination is not regarded as a "power pulse", since the motor 1 will not "see" a voltage difference over its terminals. Although the examples are given for 0 V and 12 V, the present invention is not limited to these values, and other voltage values smaller than 12 V, or larger than 12 V may also be used. Instead of applying the low voltage signal such as 0 V or the high voltage signal such as 12 V, to both power wires U, T, it is also possible to leave one (or both) of the power wires U, T "floating", e.g. by putting the output pins in "tri-state" mode (also known as "high-impedance" mode). It is to be noted, however, that during such a time period the motor position cannot be read, so, after a while, a short "clockwise" or "counter clockwise power pulse" should be applied again to the lines U, T for reading the motor position, and for adjusting the position if needed.

In an embodiment where the motor controller 10 is an integrated circuit having a programmable digital processing unit CPU and general purpose input-output pins io1-io5, such power pulses may e.g. be easily created by setting some of the io-pins to logical '1' or '0'. Depending on the drive capabilities of the pins of the integrated circuit, external circuitry such as e.g. a pnp-transistor may optionally be added. In case the integrated circuit also has a pulse-width modulation module PWM1, also a PWM-signal can be used as one or both of the power signals Us, Ts. By appropriately choosing the duty cycle of the PWM-signal, e.g. proportional to the difference between the target position and the actual motor position, a digital servo control loop can be relatively easily implemented in software on the CPU.

Figure 4A:
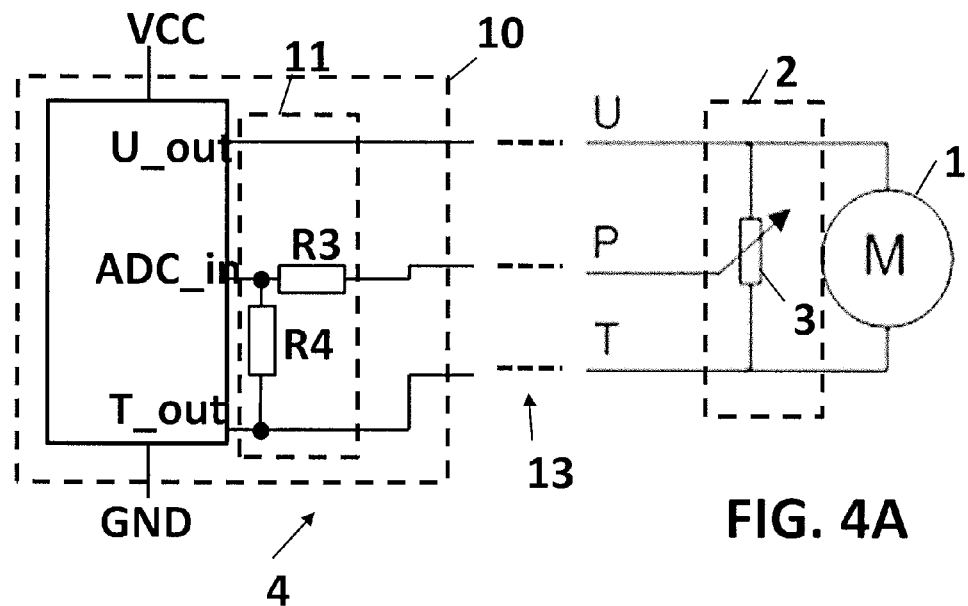
FIG. 4A shows a motor control system as can be part of embodiments of the present invention. The motor module has a potentiometer but no rectifier, and also requires only three wires for powering and measuring the motor position.

FIG. 4A shows a motor power and position measurement system as can be used in embodiments of the present invention. The motor module 2 has a potentiometer 3 operatively, e.g. mechanically, coupled to the motor 1 for converting a position, e.g. rotational position of the motor 1 into a variable resistance. It is to be noted, however, that this motor module 2 does not have a rectifier circuit 12, thus compared to FIG. 3A the four diodes D2-D5 can be omitted. The potentiometer 3 is connected in parallel with the motor 1. This circuit also requires only three wires U, T, P for powering the motor 1 and for measuring the motor position. Also in this embodiment the motor 1 may be part of the motor module 2 or not, and the motor controller 10 may optionally further comprise a voltage divider 11 for reducing the voltage range of the position feedback signal Ps to a range acceptable for an analog-to-digital (ADC)-convertor which may be present in the motor controller 10, as described above. The motor 1 can be selectively driven in either direction, i.e. clockwise or counter clockwise, by applying suitable first and second power signals Us, Ts to the power lines U, T of the three-wire interface 13. Most of what was described for the embodiment of FIGS. 3A to 3C is also applicable for the circuit of FIG. 4A, e.g. that the motor position can be read by applying a short "clockwise" or "counter clockwise power pulse", but there is an important difference in the interpretation of the position feedback signal Ps, due to the fact that this motor module 2 does not have rectifier, as will be described next.

Figure 4B:
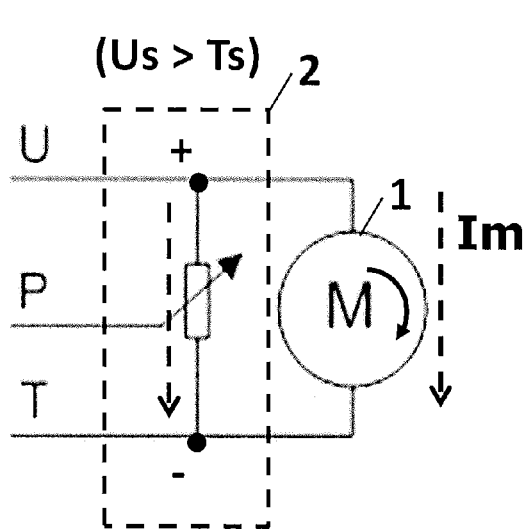
FIG. 4B illustrates the current flow in the motor module of FIG. 4A, in case the motor is powered for turning in a first direction, e.g. clockwise.

FIG. 4B shows what happens when a voltage Us having a momentary voltage level larger than that of Ts is applied to the first resp. second power line U, T of the motor module 2. Suppose e.g. that Us=12 V DC and Ts=0 V DC, then a current Im will flow through the motor 1 as indicated by the arrow, for powering the motor 1 for turning in a first direction, e.g. "clockwise". At the same time, i.e. while the motor 1 is being powered, a current will also flow through the potentiometer 3 thereby creating a position signal Ps which is applied to the third wire P of the three-wire interface 13. The value of Ps is an indication of the position of the motor 1.

Figure 4C:
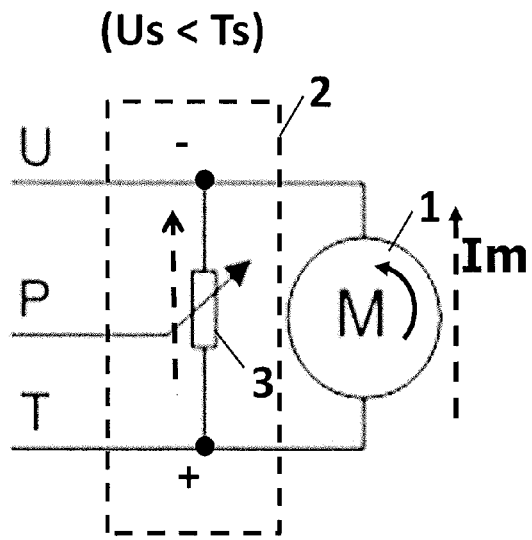
FIG. 4C illustrates the current flow in the motor module of FIG. 4A, in case the motor is powered for turning in a second direction, e.g. counter clockwise.

FIG. 4C is a variant of FIG. 4B, and shows what happens when a voltage Us having a momentary voltage level smaller than that of Is is applied to the first resp. second power line U, T of the three-wire interface 13. Suppose e.g. that Us=0 V DC and Ts=12 V DC, then a current Im will flow through the motor 1 as indicated by the arrow, for powering the motor 1 for turning in a second direction opposite the first direction, e.g. "counter clockwise". At the same time, i.e. while the motor 1 is being powered, a current will also flow through the potentiometer 3 thereby creating a position signal Ps which is applied to the third wire P of the three-wire interface 13. The value of Ps is an indication of the position of the motor 1. An important difference between the situation in FIG. 4B and FIG. 4C is that the direction of the current through the potentiometer 3 depends on whether the motor module 2 is powered for turning "clockwise" and for turning "counter clockwise". This requires special treatment as will be described next.

Figure 5:
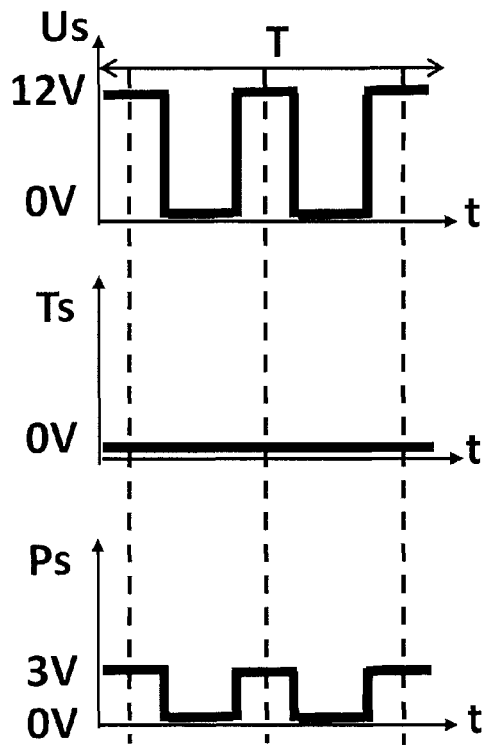
FIG. 5 shows an example of first and second power signals applied to, and a position feedback signal obtained from the motor module of FIG. 4B.

FIG. 5 shows an example of first and second power signals Us, Ts applied to the first and second power wire U, T of the three-wire interface 13, as may be used in FIG. 4B. FIG. 5 also shows a corresponding position-feedback signal Ps, in the example having an amplitude of 3V (assuming that the actual motor position was 25% between its outermost counter clockwise position and its outermost clockwise position). Depending on whether a voltage divider 11 is present in the circuit of FIG. 4A or not, this signal Ps should be scaled down. It is to be noted that the position information Ps is available and valid only when the first and second power signals Us, Ts differ, i.e. when power is delivered to the motor 1, e.g. when taken at time instances indicated by the dotted vertical lines in FIG. 5. The powering signals Us, Ts of FIG. 5 would normally cause the motor 1 to turn clockwise. (It is to be noted that the signal Ts is deliberately shown slightly above the time-axis, for illustrative purposes). The position signal Ps is caused by a voltage division applied by the potentiometer 3 while the motor 1 is being powered. The first power signal Us is generated as a PWM-signal, in the example having a duty of about 40%, but this value may be dynamically changed by the motor controller 10, e.g. depending on the difference between the actual motor position and the desired (target) motor position, or depending on an external force exerted upon the motor 1, which force should be counteracted for keeping the motor in a stable target position.

Figure 6A:
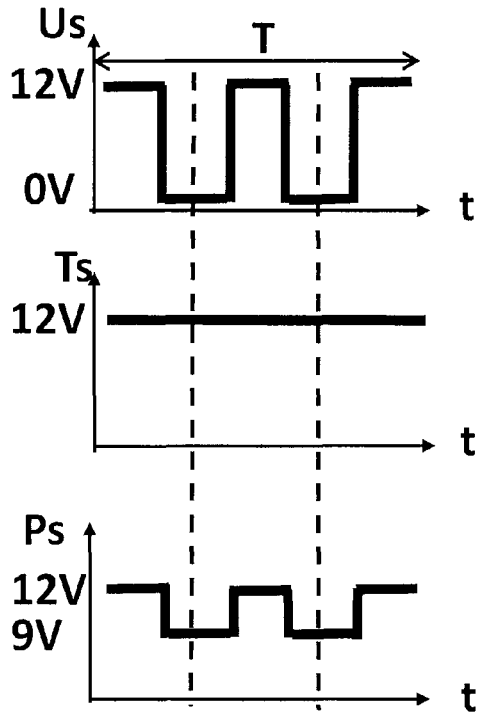
FIG. 6A shows an example of first and second power signals applied to, and a position feedback signal obtained from the motor module of FIG. 4C.

FIG. 6A shows an example of first and second power signals Us, Ts applied to the first and second power wire U, T of the three-wire interface 13 as may be used in FIG. 4C. FIG. 6A also shows the corresponding position-feedback signal Ps, assuming that the actual motor position is still 25%. It should not come as a surprise that when the motor is powered in the opposite direction (e.g. for turning "counter clockwise" in case of FIG. 6A), that the position signal Ps abruptly changes from 3 V to 9 V in this example. This is because the polarity of the nodes of the potentiometer 3 in FIG. 4C are not the same as in FIG. 4B, in contrast to the circuit of FIG. 3A having a rectifier 12. Again, depending on whether a voltage divider 11 is present, the signal Ps in FIG. 6A should be scaled down. It is to be noted that the position information Ps is again available only when the first and second power signals Us, Ts differ, i.e. at time instances when power is delivered to the motor 1, as indicated by the dotted vertical lines. The powering signals of FIG. 6A would normally cause the motor 1 to turn counter clockwise.

Figure 6B:
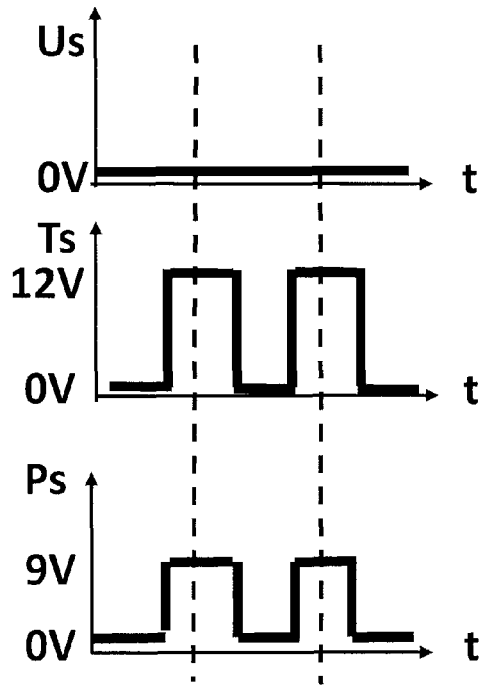
FIG. 6B shows a variant of the signals of FIG. 6A.

FIG. 6B shows another set of power signals Us, Ts which would obtain the same effect on the motor 1 as the signals of FIG. 6A, i.e. powering the motor 1 for turning "counter clockwise", and would result in the same position information, taking into account the time-instances when the position signal is valid, and assuming the motor position is still 25%.

Other alternatives (not shown) whereby individual pulses or pulse width modulated signals (with the same or different duty cycles) are provided on both power lines U, T are also envisaged. For example, two PWM-signals with the same duty cycle and 180° phase shift, may be used for maintaining a fixed motor position while exerting a torque.

Figure 7A:
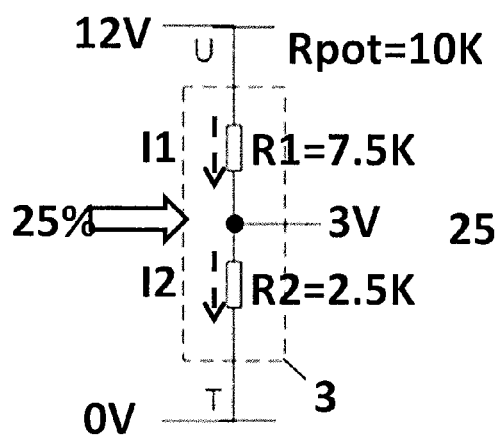
FIG. 7A and FIG. 7B illustrate an electrical equivalent circuit for part of the circuit shown in FIG. 4A, without a voltage divider (FIG. 7A) and with a voltage divider (FIG. 7B), respectively, and with power signals for turning the motor in the first direction, e.g. clockwise.
Figure 8A:
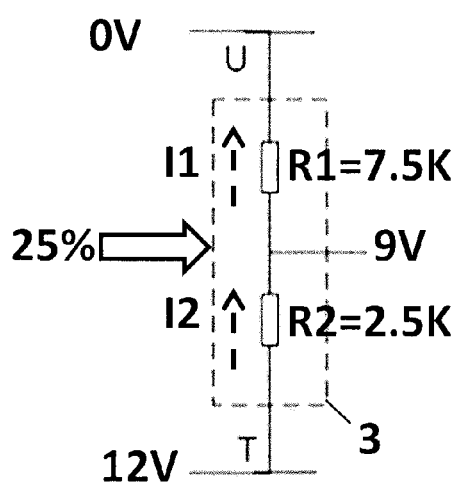
FIG. 8A and FIG. 8B illustrate an electrical equivalent circuit for part of the circuit shown in FIG. 4A, without a voltage divider (FIG. 8A) and with a voltage divider (FIG. 8B), respectively, and with power signals for turning the motor in the second direction, e.g. counter clockwise. It is to be noted that this is the same circuit as FIG. 7A and FIG. 7B, but the power signals are reversed.

FIG. 7A and FIG. 8A explain why the voltage value of the position feedback signal Ps "suddenly jumps" from 3 V to 9 V when the motor module 1 previously being powered for rotation in the first direction (e.g. clockwise, corresponding to FIG. 4B and FIG. 5), is subsequently powered for rotation in the second direction (e.g. counter clockwise, corresponding to FIG. 4C and FIG. 6A). Assuming a potentiometer of 10 kΩ is used, and assuming the actual motor position is 25%, then R1=7.5 kΩ and R2=2.5 kΩ, and the output of the potentiometer is then 25%×12 V=3 V in FIG. 7A, but 75%×12 V=9 V in FIG. 8A.

A curve showing the actual motor position (expressed in % between the outermost counter clockwise position corresponding to 0%, and outermost clockwise position corresponding to 100%) in function of the position signal Ps for the situation illustrated in FIG. 7A, would be a straight line, where Ps=0 V corresponds to position=0% and Ps=12 V corresponds to position=100%.

A curve showing the actual motor position in function of the position signal for the situation illustrated in FIG. 8A, would also be a straight line, but now Ps=0 V corresponds to position=100% and Ps=12 V corresponds to position=0%. This can easily be calculated using Kirchhoff's laws, but is only true if no current is drawn from the position wire P.

Figure 7B:
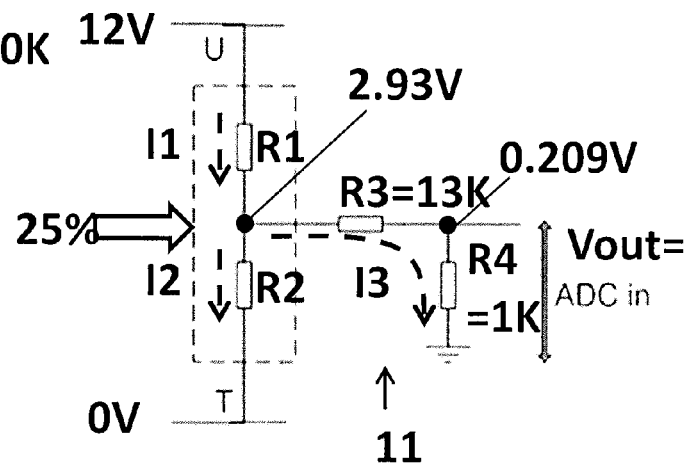
Figure 8B:
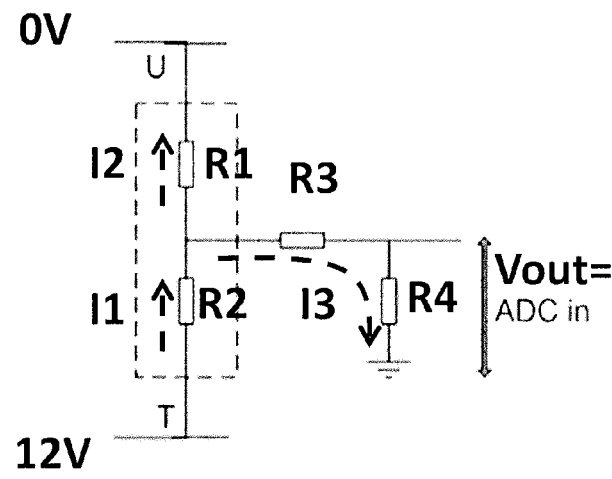

FIG. 7B and FIG. 8B show equivalent circuits for the measurement circuitry, as part of the control circuit in FIG. 4A, for the case where the optional voltage divider circuit 11 is present, and consists of two resistors R3, R4. In the example shown, R3=13 kΩ, and R4=1 kΩ, resulting in a maximum ADC input value of about 0.85 V. This can easily be calculated using Kirchhoff's laws. Indeed, in the 100% position: R1=0 kΩ, R2=10 kΩ, Vout=(1K/14K)*12V=about 0.857 V. In the 25% position, R1=2.5 kΩ, R2=7.5 kΩ, I1=1.383 mA, I2=1.174 mA, I3=0.209 mA, V2 (over R2)=2.934 V, V4 (over R4)=Vout=0.209 V. This can be calculated using Kirchoff's laws. It is to be noted that V2=2.93V in the measurement circuit of FIG. 7B (with the voltage divider) is only slightly less than the V2=3.0 V in the measurement circuit of FIG. 7A (without the voltage divider).

Figure 9:
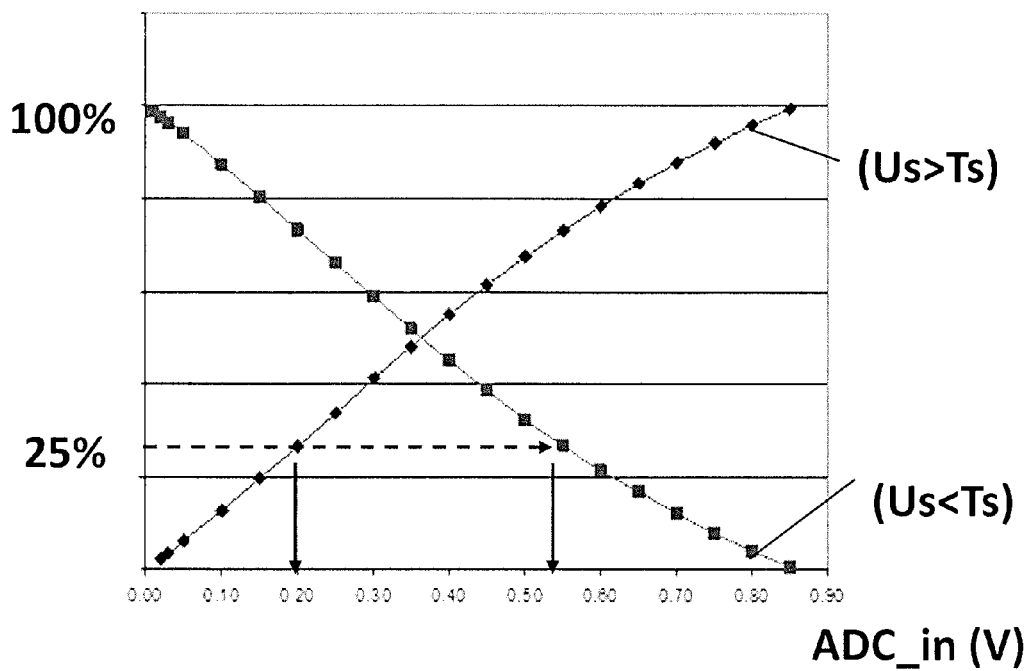
FIG. 9 shows two curves for converting the feedback voltage into the actual rotational motor position, for an example of a circuit of FIG. 4A, using the resistor values of FIG. 7B.

Using Kirchoff's laws, the ADC input voltage (i.e. the voltage over R4) can be calculated for each motor position, as shown in FIG. 9. The two curves show the motor position (in % of the rotation angle) versus the feedback signal Ps after voltage division for the measurement circuits of FIG. 7B and FIG. 8B. It is to be noted that these curves are not linear anymore, because current is drawn by the voltage divider 11. Depending on whether the first power signal Us is larger or smaller than the second power signal Ts, either one of the two curves should be used for converting the measured position signal Ps into the actual motor position. The values of these curves may be stored in a look-up table in a memory of the motor controller 10, or may be calculated when needed using mathematical formulae, e.g. implemented in software in the CPU of the motor controller 10.

It is to be noted that in applications not requiring accurate motor positioning, e.g. where the actual motor position may deviate e.g. 2% or 5% or more from the desired position, these curves may be approximated by a straight line, or by a piecewise linear approximation having e.g. three segments. The curves are however required in applications requiring accurate motor positioning, e.g. where an absolute accuracy of less than 2%, or less than 1% is required. The number of points for representing the curves can be chosen by the skilled person depending on the accuracy required, and intermediate positions may then e.g. be calculated using linear interpolation.

Figure 10A:
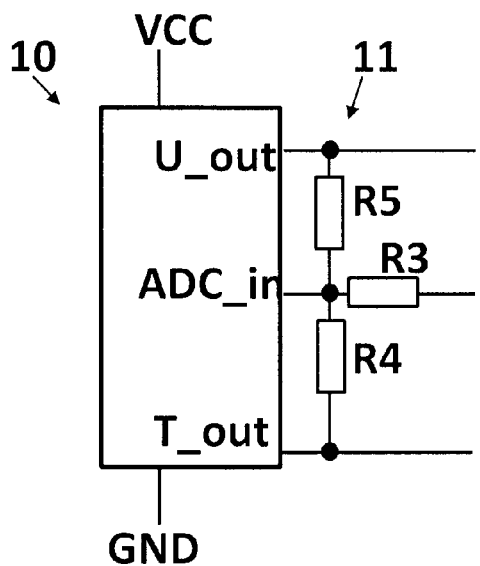
FIG. 10A and FIG. 10B show variants of the motor module of FIG. 3A and FIG. 4A, with other voltage dividers.
Figure 10B:
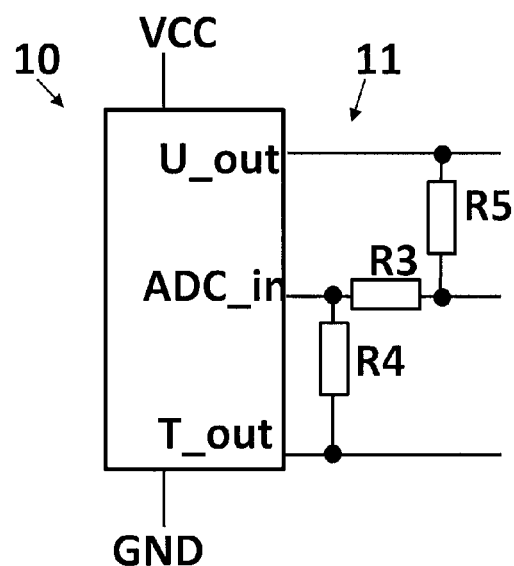

FIG. 10A and FIG. 10B show variants of the voltage divider circuit 11, each having three resistors R3, R4, R5, as can be used in the circuit of FIG. 3A and FIG. 4A. An advantage of adding the extra resistor R5 as in the circuits of FIG. 10A and FIG. 10B is that it may provide a more balanced voltage division for providing a smaller non-linearity error as compared to a voltage divider consisting of only two resistors R3, R4. The values for R3, R4, R5 may e.g. be calculated by solving the set of equations: (R3+R4+R5)=8×Rpot; R4/(R3+R4)=1/13; R5=R3+R4, whereby the factor 8 can be replaced by another suitable factor larger than 2, but smaller values cause more non-linearity.

Figure 11:
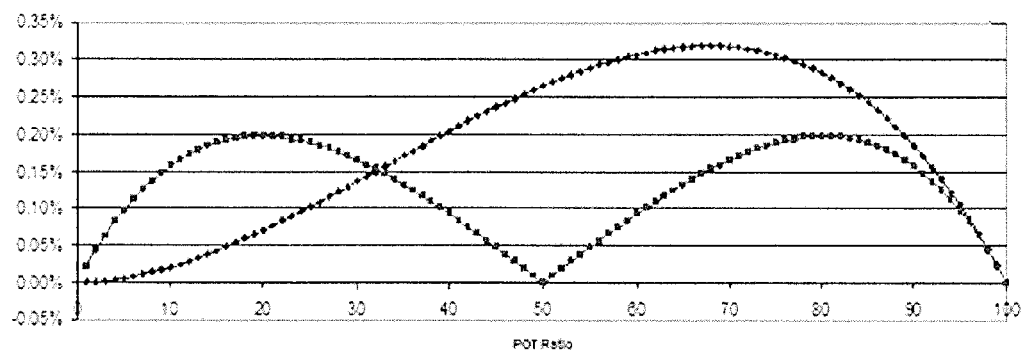
FIG. 11 shows an example of the error introduced by the measurement circuit of FIG. 7B for a 5% variation of the potentiometer value.

FIG. 11 shows the maximum position error of the curves of FIG. 9 for a 5% variation of the potentiometer value, i.e. assuming the potentiometer 3 has a value in the range of 9.5 kΩ to 10.5 kΩ, and using the voltage divider of FIG. 10B, whereby R3=39 kΩ, R4=3 kΩ, R5=42 kΩ. As can be seen from FIG. 11, the maximum deviation between the real motor position, and the calculated motor position as obtainable from the curves of FIG. 9, is less than 0.35%, which is sufficiently accurate for most applications, e.g. for positioning air-conditioning valves in cars.

When comparing the motor module 2 of FIG. 4A with that of FIG. 3A, the main difference is that the motor module 2 of FIG. 4A does not require a rectifier circuit 12, at the expense of a slightly increased complexity (two curves instead of only one) for converting the position feedback signal Ps into the actual motor position. However, since this complexity can be easily implemented in software if the motor controller 10 has a programmable digital processing unit CPU, the increased complexity should not be over-estimated, because such processor already implements a servo-algorithm, which is more complex than a function or a look-up table.

Figure 12:
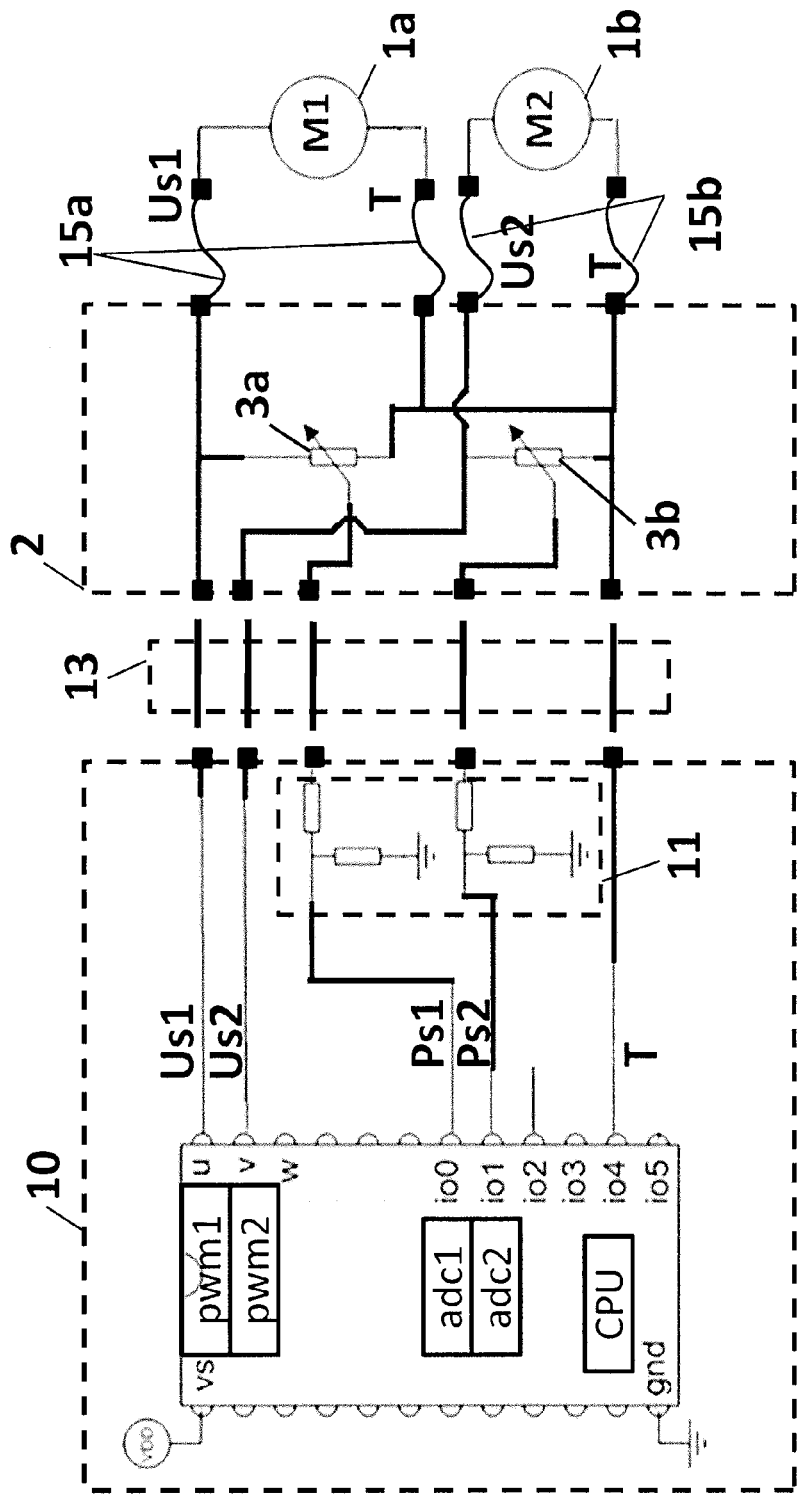
FIG. 12 shows an example of a motor control system for controlling two DC-motors over a wire interface having only five wires, according to an embodiment of the present invention.

FIG. 12 shows an example of motor control system 4 according to embodiments of the present invention, whereby a motor controller 10 comprises an integrated motor control IC for driving two DC-motors M1, M2, and wherein the motor module 2 may or may not comprise the two motors M1, M2. In the latter case, two short (e.g. less than 5 cm) wires 15a, 15b may be used to interconnect the motor module 2 and the motors 1a, 1b. The motor module 2 is connectable via a five-wire interface 13 to the motor controller 10. The length of the wire-interface 13 may be larger than 50 cm, or larger than 1 m, or even larger than 2 meters. In the configuration of FIG. 12, the first motor M1 receives a first power signal Us1 and a second power signal T, and the corresponding potentiometer 3a receives the same first and second power signals Us1 and Ts, and is adapted to provide an output voltage as the first position signal Ps1 of the first motor M1 to the motor controller 10. The second motor M2 receives another first power signal Us2, but the same second power signal Ts, and the corresponding potentiometer 3b provides a second position signal Ps2 to the motor controller 10. It is to be noted that the second power signal Ts is common for the two motors, or in a more generalised case of more than two motors, common to at least two motors, e.g. to all the motors.

The motor controller 10 has two output pins U, V for providing the first power signals U1s, U2s to the respective motors M1, M2. These pins may be set low (GND), high (VDD), tri-state (Z), or may be connected to the outputs of two internal PWM-modules PWM1, PWM2.

Figure 13:
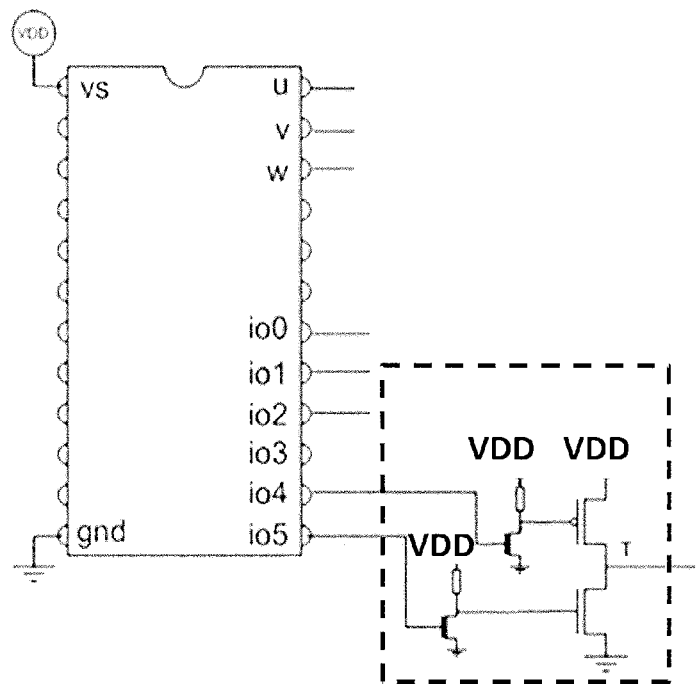
FIG. 13 shows an alternative for part of the motor control system of FIG. 12, whereby two input/output-pins are used to drive an external H-bridge.

A single general purpose input-output pin (GPIO), e.g. io4 is used for providing the common second power signal Ts. Alternatively (not shown in this example) the second power signal Ts can be generated by a PWM-module. In yet other embodiments, the second power signal Ts can be generated by two general purpose input-output pins (GPIO), as illustrated in FIG. 13. The pins io4 and io5 are used for controlling an external H-bridge 14 for generating the second power signal Ts as one of the following signals: ground GND, or the supply voltage VDD, or a tri-state signal Z, whereby Ts is to be commonly applied to each of the two motors. Using two output-pins io4, io5 instead of one output pin and an invertor, offers the advantage that the timing of enabling/disabling the transistors, e.g. pnp and npn-transistors or p-fet and n-fet transistors of the H-bridge 14 can be accurately controlled, so as to avoid short-cut between the power VDD and ground GND, and also that the second power wire T can be put in tri-state mode Z when both transistors are off. H-bridges are well known in the art of motor control, and need not be explained further herein.

Referring back to FIG. 12, two pins io0, io1 may be used for receiving the position feedback signals Ps1, Ps2 from the potentiometers 3a and 3b respectively. These pins io0, io1 may be coupled to two internal analog-to-digital convertors ADC1, ADC2 for converting the position feedback signals Ps1, Ps2 to digitized values. In another embodiment (not shown), a single ADC could be sufficient, provided that each of the two io-pins io0, io1 can be routed thereto. The motor controller 10 further has a digital processor, e.g. programmable control logic, or a CPU for converting the digitized position values to the actual motor positions, using formulas or tables as described above, optionally or additionally also using linear interpolation techniques for reducing the data to be stored in memory. The CPU may also implement a servo control loop by determining suitable first power signals Us1, Us2 and second power signal Ts for driving each of the two motors M1, M2 towards their target positions, e.g. to a first and a second predetermined target position.

In an embodiment, the integrated motor control IC of FIG. 12 is configured for driving the motors in alternating time slots, one for each motor, thereby implementing two simultaneous servo control loops.

In another embodiment each motor M1, M2 is brought to its target position before the other motor is activated. Thus, in a first step the position of the first motor M1 is measured as described above, e.g. by applying a short "clockwise or counter clockwise power pulse". Based on a comparison of the first target position and the actual first motor position, a suitable DC-signal and/or pulse signal and/or PWM-signal is determined and applied to the first motor 1, by providing appropriate first and second power signals Us1, Us2 and T to the five-wire interface 13. For example, if a clockwise torque is to be applied to the first motor, the first power signal Us1 to the first motor may be set to +12V, and the second power signal T to the first motor may be 0 V, but this is also the second power signal of the second motor M2. If no torque is to be exerted on the second motor M2, the first power signal Us2 to the second motor M2 may be set equal to the second power signal Ts, in this example 0 V, or may be set to tri-state. A method similar to that described in U.S. Pat. No. 5,705,907 may be used to limit the overshoot. The time required for bringing the first motor M1 in its desired position depends on several factors, for example: the angular distance between the start-position and the end-position, any external force exerted upon the first motor M1, etc. When the first motor M1 has reached its destination within a predefined margin of e.g. 1% or 2% or more, depending on the application requirements, the first power signal Us1 may be set to tri-state, or may be set equal to the value of Ts. In the next step the second motor M2 is brought to its target position. For example, if the second motor needs to be turned counter-clockwise, the second power signal T may then be set to +12V, and the first power signal Us2 for the second motor M2 may be set to 0V, during a second time interval, and the first power signal Us1 to the first motor may then also be set to +12V or to tri-state. And then the cycle repeats.

Instead of bringing each motor in its desired position, one after the other, it is also possible to drive the motors M1, M2 in a time-multiplexed manner, for example to drive a first motor during a first time slot of for example 5 ms, then the second motor during 5 ms, etc, but any other method known to the person skilled in the art of driving motors, may also be used.

It is possible for example to provide power to only one of the motors while providing no power to the other motor, e.g. by setting Us1 to +12V and Is to 0V, and Us2 to tri-state. Alternatively it is also possible to always actively drive all first power signals Us1, Us2, e.g. by setting Us1 to +12V and Ts to 0V, and Us2 to 0V. In this case however, when the first motor is driven back and forth, in order to provide no power to the second motor M2, the signal Us2 has to change along with the second power signal, thus when Us1 is set to 0V and Ts to +12V, Us2 also needs to be set to +12V, if no power is to be applied to the second motor. Thus using tri-state signals is easier.

In the example of FIG. 12, the motor controller 10 and the voltage dividers 11 may be located on a first PCB. This first PCB would be connected to the potentiometers 3a and 3b via a five-wire interface 13. The potentiometers 3a, 3b could be located on a second PCB (as illustrated), which second PCB could be connected to each motor via two pairs of two wires each. In this example the second PCB having a five-pins connector and a pair of two-pin connectors and two potentiometers could be seen as the motor module 2.

In a variant of the circuit of FIG. 12, each potentiometer 3a, 3b could be located on a separate, small, PCR nearby the corresponding motor, and each of these small PCBs could be connected to the five-wire interface 13, e.g. via an interface-board (not shown) having a five-pins connector with wires U1, U2, P1, P2, T, and two three-pin connectors with wires U1, P1, T, and U2, P2, T respectively, which would be interconnected on the interface-board. In this example, the motor module 2 could be considered as to comprise the interface-board and the two small PCBs with the potentiometers. But other hardware configurations are also possible, as will be appreciated by the person skilled in the art.

In a variant of the circuit of FIG. 12 (not shown), the second power signal Ts is permanently set to VDD/2, e.g. to +6 V. By applying the first power signals Us1, Us2 as any of a low voltage, e.g. 0 V DC-signal, or a high voltage, e.g. 12 V DC signal, or a PWM-signal with an amplitude of the high voltage signal, e.g. 12 V, and a fixed or variable duty-cycle, the motors M1 and M2 can be driven selectively clockwise (when e.g. Us=12 V DC or PWM duty cycle >50%) or counter clockwise (when e.g. Us=0 V DC or PWM duty cycle <50%), or maintained in position (PWM duty cycle=50%). In such a circuit, the second power signal T need not be generated by the motor controller 10, thus at least one io-pin, io4 in FIG. 12, io4 and io5 in FIG. 13, can be saved. In such embodiment a position signal Ps1, Ps2 is present for all the motors M1, M2 at the same time, and a torque is exerted upon all the motor all the time, if desired. It should be mentioned however, that even when Ts=+6 V, it is also possible to set one or both of the first power signals Us1, Us2 to tri-state, if so desired, but then at least one of the motors is not actively kept in position all the time. Summarizing, the motor controller 10 of FIG. 12 is thus able to drive two motors M1, M2 in any direction, simultaneously or one after the other or a mix thereof, and to measure their positions, even if they are stationary, over a five-wire interface 13.

The present invention is, however, not limited to two motors, but also works for more than two motors, for example for driving three motors over a seven-wire interface 13. The skilled person can readily extend the circuit of FIG. 12 to drive three motors, e.g. by replacing the five-wire interface 13 by a seven-wire interface 13, by using pin W to provide a signal Us3 as the first power signal for the third motor M3 (not shown), and by using pin io2 to receive a third position signal Ps3 (not shown), and by adding a third voltage divider (not shown), and by adding a third potentiometer (not shown) on the motor module 2. The algorithm to drive the three motors can work in similar manner as described above for two motors, e.g. by using series of three time-slots, wherein the first time-slot is used to drive the first motor M1 while leaving the second and third motor un-powered, etc.

It is to be noted that the present invention is not limited to two or three motors, but can also be used to drive more than three motors, e.g. ten motors, or even more. In case of ten motors, the wire-interface 13 would have 2×10+1=21 wires, in general: twice the number of motors plus one.

In the description provided herein, numerous specific details are set forth. However, it is understood that embodiments of the invention may be practiced without these specific details. In other instances, well-known methods, structures and techniques have not been shown in detail in order not to obscure an understanding of this description.

Although the invention is described by using specific values for the supply voltage VDD, for the resistance of the potentiometer 3, and for the voltage divider 11, it is clear that other values may also be used. Curves similar to those of FIG. 9 can easily be determined e.g. by calculations using Kirchhoff's laws, or by circuit simulation tools.

REFERENCES

1 DC-motor
2 motor module
3 variable resistor, e.g. potentiometer
4 motor control system
10 motor controller
11 voltage divider
12 rectifier circuit
13 wire-interface
14 external H-bridge
15 wires, e.g. loose wires
Us first power signal
Ts second power signal
Ps position signal
Vdd supply voltage
Gnd ground

The invention claimed is:

1. A motor control system for controlling a plurality of DC-motors, the motor control system comprising:
    a motor controller, configured for providing a number of first power signals each for being applied to one of the DC motors and a single common second power signal for powering the plurality of DC-motors, and configured for receiving a plurality of position feedback signals from the plurality of DC-motors;
    one or more motor modules connectable to the plurality of DC-motors and comprising for each of the plurality of DC-motors a variable impedance configured for being operatively connected to one of the DC motors and for creating an impedance indicative of a position of said one DC-motor;
    a wire interface for interconnecting the one or more motor modules and the motor controller for transferring the plurality of first power signals and the single common second power signal and the plurality of position feedback signals;
    wherein each variable impedance is arranged for being powered by one of the first power signals and by the common second power signal and for generating one of the position feedback signals when the corresponding DC-motor is being powered;
    and wherein the number of wires of the wire interface is twice the number of DC-motors plus one.

2. The motor control system according to claim 1, wherein the number of DC motors is two and the wire-interface has exactly five wires, or the number of DC motors is three and the wire-interface has exactly seven wires.

3. The motor control system according to claim 1, wherein the motor controller is configured for reading the position feedback signal of a corresponding DC-motor which is being powered.

4. The motor control system according to claim 1, wherein each variable impedance is a potentiometer.

5. The motor control system according to claim 4, wherein each potentiometer is configured for receiving the same power signals as the corresponding DC-motor.

6. The motor control system according to claim 1, wherein the motor controller is configured for providing a pulsed power signal as at least one of the first and second power signal.

7. The motor control system according to claim 1, wherein the motor controller comprises:
    at least one analog-to-digital-convertor for digitizing the position feedback signals;
    at least one pulse width modulation module for generating at least one pulse width modulated signal as at least one of the first and second power signals;
    a processing unit provided with an algorithm for determining a duty cycle of the at least one pulse width modulation module for driving the plurality of DC-motors at a plurality of predefined positions.

8. The motor control system according to claim 7, further comprising at least one voltage divider, arranged for reducing the amplitude of the position feedback signals to a range suitable for the at least one analog-to-digital-convertor.

9. The motor control system according to claim 8 wherein each voltage divider consists of two resistors or consists of three resistors.

10. The motor control system according to claim 1, wherein the motor controller is provided with an algorithm for correcting a non-linear relation between the actual motor positions and the position feedback signals.

11. A motor controller for controlling a plurality of DC-motors, the motor controller being connectable via a wire interface to one or more motor modules connectable to the plurality of DC-motors and comprising for each of the plurality of DC-motors a variable impedance configured for being operatively connected to one of the DC motors and for creating an impedance indicative of a position of said one DC-motor;

the motor controller being configured for providing a plurality of first power signals, each for being applied to one of the DC motors and a single common power signal for powering the plurality of DC-motors and for powering the plurality of variable impedances being configured for generating a position feedback signal when being powered;

the motor controller being configured for reading at least one of the position feedback signals at a moment when the corresponding first power signal and the common second power signal have different voltage levels.

12. Method for driving a plurality of DC-motors over a wire interface selectively in a first and second direction, whereby the number of wires of the wire-interface is twice the number of DC-motors plus one, and for reading the positions of the plurality of DC-motors, the method comprising the steps of:

a) generating a plurality of first power signals, generating a single common second power signal, and applying the plurality of first power signals and the single common second power signal to the plurality of DC-motors over the wire interface, whereby at least one of the first power signals and the single common second power signal have different voltage levels for driving at least one of the DC-motors;

b) generating at last one position feedback signal of said at least one driven DC-motor, and applying the at least one position feedback signal to the wire interface;

c) determining at least one actual position of the at least one driven DC-motor based on the at least one position feedback signal;

d) adjusting the plurality of first power signals and the single common second power signal based on the at least one actual motor position and on a plurality of predetermined motor positions, and applying the adjusted power signals to the wire interface.

13. The method according to claim 12, wherein the determination of the actual position of the at least one driven DC-motor in step c) includes determining whether the corresponding momentary first power signal is larger or smaller than the common second power signal.

14. The method according to claim 12, wherein generating at least one position feedback signal includes generating a position feedback signal over a variable resistance.

15. The method according to claim 12, wherein generating the first and second power signals comprises providing two different signals selected from the group of a supply voltage, a ground voltage and a pulse width modulated signal during a time interval.

16. The method according to claim 12, wherein generating a first and second power signal comprises providing a pulse width modulated signal as one of the first and second power signals, and providing a DC signal as the other of the first and second power signals.

17. The method according to claim 16, wherein the DC-signal is substantially equal to half of the supply voltage.

18. The method according to claim 12, wherein at least one of the first power signals is set to tri-state.

19. The method according to claim 12, furthermore comprising a step e) of reducing the amplitude of the position feedback signal by means of passive components.

20. The method according to claim 12, furthermore comprising digitizing the position feedback signal in an analog-to-digital-convertor, and further comprising a step f) of executing an algorithm for correcting a non-linear relation between the actual DC-motor position and the position feedback signal.

\* \* \* \* \*